(No Model.)

J. H. MYERS.
BALL BEARING.

No. 521,987. Patented June 26, 1894.

WITNESSES:
John C. Buchanan
George H. White

INVENTOR.
James H. Myers
By Ithiel J. Cilley
ATTORNEY

UNITED STATES PATENT OFFICE.

JAMES H. MYERS, OF GRAND RAPIDS, MICHIGAN.

BALL-BEARING.

SPECIFICATION forming part of Letters Patent No. 521,987, dated June 26, 1894.

Application filed September 27, 1893. Serial No. 486,637. (No model.)

*To all whom it may concern:*

Be it known that I, JAMES H. MYERS, a citizen of the United States, residing at Grand Rapids, in the county of Kent and State of Michigan, have invented certain new and useful Improvements in Ball-Bearings, of which the following is a specification.

My invention relates to improvements in ball bearings for use upon wheeled road vehicles, and its objects are: first, to lessen the friction upon the bearings of wheeled vehicles; second, to provide a ball bearing with which the grooves in the axle and the sleeve will each—in cross section—form an unbroken semicircular bearing, and will thus avert the danger of crushing the balls by reason of irregularities in the surface of contact; third, to dispense with the use of nuts for securing the wheel upon the axle; and, fourth, to prevent sand and dust from getting into the working bearings. I attain these objects by the mechanism illustrated in the accompanying drawings, in which—

Figure 1:
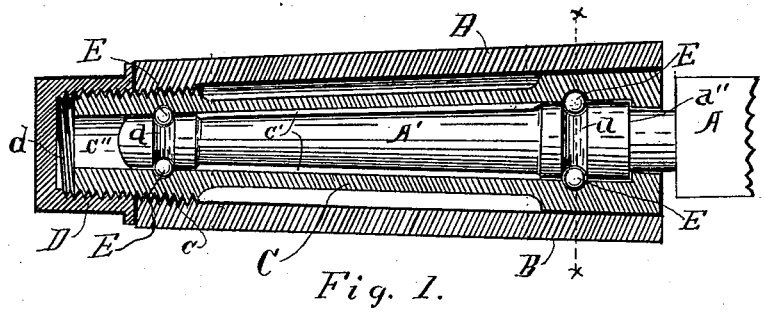
Figure 2:
Figure 3:
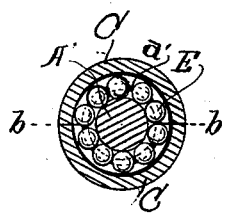

Figure 1. is a longitudinal section of my journal box upon an axle. Fig. 2. is a side view of the same with the box removed. Fig. 3. is a cross section of Fig. 2. on the line $x$ $x$ of Fig. 1.

Similar letters refer to similar parts throughout the several views.

In the accompanying drawings A is the end of the axletree, and A' is the spindle thereon for the reception of the wheel.

In forming my ball bearings I make a metal sleeve, C, that will fit loosely over the bearing end of the axle. I then form two or more grooves $a$ around the outer surface of the axle, and corresponding grooves, in the sleeve, of a proper size and form—in transverse-section—to insure a perfect bearing over a trifle less than one-half the corresponding circumference of the balls E so that the axle and the sleeve are held slightly out of contact, as indicated by the line $d'$ in Fig. 3.

In order to insert the balls it is necessary to divide the sleeve C longitudinally, in halves, upon the line $b$, $b$, and I secure it in the box B, by means of a screw $c$ formed upon the smaller or outer end of the sleeve, and a corresponding screw inside of the box; and to secure it solidly to place and arrange for adjusting it to the wear of the balls or bearing I make this threaded end slightly tapering and long enough to extend beyond the box and receive a jam nut D which acts a double purpose: first, of holding the sleeve firmly to place in the box when it has been properly adjusted; and, second, of preventing dust, sand, &c., from entering the sleeve and causing the bearings to cut.

One of the principal objects of my invention is to avert the necessity of forming a division in the bearing in the sleeve or the axle, immediately upon the line of the center of the groove where the principal bearing on the balls takes effect, and to accomplish this, and enable me to insert the balls it is necessary to divide the sleeve longitudinally as hereinbefore indicated, and as shown in Figs. 2 and 3.

I leave a chamber $c'$ between the axle and the sleeve, which I utilize as a storage chamber for any lubricant I may desire to use, as oil, plumbago, &c.

To prevent dust from entering the sleeve from the back end. I form a shoulder $d''$ around the axletree, and a corresponding offset on the end of the sleeve, to lap by it, as shown in Fig. 1.

Having thus fully described my invention, what I claim as new, and desire to secure by Letters Patent of the United States, is—

1. In a ball bearing, for vehicles, an axle A' having grooves around its working bearing and balls to travel therein; in combination with a sleeve divided longitudinally, and having grooves formed around its inner surface, and a supporting box, said sleeve screwed into said box and secured to revolve with the wheel, substantially as, and for the purpose set forth.

2. In a ball bearing, an axle having grooves around its working bearing, and balls to travel in said grooves; in combination with a sleeve divided longitudinally, and having corresponding grooves around its inner surface, each of said grooves being nearly semi-circular in transverse section, a supporting box secured in the hub, and the sleeve screwed into said box, and a jam nut for adjustably securing said sleeve, substantially as, and for the purpose set forth.

3. In a ball bearing, an axle having grooves around its working bearing and balls for traveling in said grooves; in combination with a sleeve divided longitudinally into halves, and having grooves around the inner surface of said sleeve corresponding with the grooves in the axle, each of said grooves nearly semicircular in transverse section, an oil chamber between the axle and the sleeve, a closed jamb nut at the outer end there being a groove and shoulder at the inner end of the sleeve to form a dust-tight joint, and a supporting box substantially as, and for the purpose set forth.

Signed at Grand Rapids, Michigan, this 23d day of September, 1893.

JAMES H. MYERS.

In presence of—
E. McWHINNEY,
I. J. CILLEY.